United States Patent [19]

Grimm et al.

[11] Patent Number: 5,313,034
[45] Date of Patent: May 17, 1994

[54] THERMOPLASTIC WELDING

[75] Inventors: Robert A. Grimm; David A. Grewell, both of Columbus; Marc St. John, Reynoldsburg; Ohio

[73] Assignee: Edison Welding Institute, Inc., Columbus, Ohio

[21] Appl. No.: 821,981

[22] Filed: Jan. 15, 1992

[51] Int. Cl.⁵ .............................. B23K 13/02
[52] U.S. Cl. ..................... 219/765; 219/553; 219/777; 219/634; 156/274.2; 156/274.6; 428/220
[58] Field of Search ................. 219/10.53, 10.43, 8.5, 219/9.5, 10.41, 10.57, 10.59, 10.61 R, 10.75, 10.79, 553, 528, 548, 547; 428/220, 284, 285; 156/273.9, 274.2, 274.6

[56] References Cited

U.S. PATENT DOCUMENTS

| | | | |
|---|---|---|---|
| 2,742,390 | 4/1956 | Beck | 154/126 |
| 3,348,640 | 10/1967 | Thompson et al. | 188/250 |
| 3,954,541 | 5/1976 | Landgraf | 156/275 |
| 4,120,712 | 10/1978 | Sindt | 156/71 |
| 4,276,109 | 6/1981 | Siewert et al. | 156/273 |
| 4,330,703 | 5/1982 | Horsma et al. | 219/553 |
| 4,421,582 | 12/1983 | Horsma et al. | 156/86 |
| 4,606,962 | 8/1986 | Reyler et al. | 428/148 |
| 4,618,168 | 10/1986 | Thalmann et al. | 285/21 |
| 4,673,450 | 6/1987 | Burke | 156/153 |
| 4,705,937 | 11/1987 | Marek | 219/497 |
| 4,707,402 | 11/1987 | Thorsrad | 428/328 |
| 4,710,612 | 12/1987 | Lin et al. | 219/547 |
| 4,765,859 | 8/1988 | Heath et al. | 156/272.4 |
| 4,847,140 | 7/1989 | Jaskowski | 428/220 |
| 4,871,412 | 10/1989 | Felix et al. | 156/273.9 |
| 4,880,679 | 11/1989 | Bonazza | 428/57 |
| 4,978,825 | 12/1990 | Schmidt et al. | 219/104.3 |

OTHER PUBLICATIONS

Eveno, E. et al "Resistance Welding of Graphite Polyetneretnerketone Composites", Antec '89 pp. 493–495.

Primary Examiner—Bruce A. Reynolds
Assistant Examiner—Tu Hoang
Attorney, Agent, or Firm—Watkins, Dunbar & Pollick

[57] ABSTRACT

A process for obtaining long, continuous, thermoplastic welds on large structures. A series of tabs are used in pairs and especially in alternating, overlapping pairs to obtain resistance heating of a strip material placed in the bond line. The resistance of the tabs is less than that of the strip material. Conducting braid-tubes afford continuous welding when the bond line is curved. Alternatively, an electromagnetic field is used to take advantage of the induction heating. A wide susceptor is used to weld a current conducting substrate while avoiding bulk heating of the substrate. The unexpected property of current-conducting braid-tube susceptors, in which induction heating takes place at the center rather than at the edges of a flattened braid-tube susceptor, is used to obtain long continuous curved welds.

36 Claims, 4 Drawing Sheets

THERMOPLASTIC WELDING

BACKGROUND OF THE INVENTION

1. Field of the Invention

This invention relates to a process and a manufacture for welding bonding and/or substrate fusing surfaces together and in particular to welding using a thermoplastic as the weld material and a conductor, especially a non-metallic conductor, to heat the thermoplastic using resistance or induction heating.

2. Background

Polymeric adhesives have been commonly used to bond various substrate surfaces together. However, such materials often involve the use of monomers, catalysts, solvents and other components that present environmental and health hazards. In the case of thermoplastic composite substrates, such adhesives often fail to match the thermal performance of the composite materials they bond. Furthermore such adhesives often have relatively long curing times. Such curing times can be hastened by heating. However, heating lamps, ovens, autoclaves and the like are often difficult to use, are expensive, and can result in excessive heating resulting in deformation, uneven heat distribution and decomposition.

When the materials to be bonded are thermoplastic polymer composites, they can be joined by simply heating the interface by means of a heating element or hot plate to a temperature sufficient to allow them to be forged together when the heating source is removed. Similarly, the interface can be heated radiantly. However, these techniques have the disadvantage of being limited to the joining of small structures, the physical size being limited by the size of the hot plates, infrared lamps, and other similar heat sources. Furthermore, the bond line is often located in positions so to be inaccessible to such heating devices. In addition to the above limitations, delamination of the composite can be a serious problem.

In an attempt to solve the heating problem, Beck (U.S. Pat. No. 2,742,390) and Thompson et al (U.S. Pat. No. 3,348,640) have demonstrated the use of metallic wire resistance heating for the purpose of heating and curing polymeric adhesives. However, this method remains complicated by vapor entrapment, insufficient wetting and adhesion to one or more substrates and incompatibility in chemical resistance and mechanical strength at higher temperatures and with aging. Further problems with bonding are accentuated with higher melting engineering resins and difficult to bond polymers because of the extensive and expensive surface treatment required.

To alleviate the monomeric component and solvent hazards and problems, Thalmann et al (U.S. Pat. No. 4,618,168) have used a metallic heating wire to heat-seal two pieces of thermoplastic conduit together by fusing them to each other and to a thermoplastic sleeve surrounding the conduit joint. Sindt (U.S. Pat. No. 4,120,712) uses an induction heating device to produce eddy-current heating in steel shims to melt a hot-melt adhesive covering the outer surface of the shim.

The use of a metallic element made from wires, films, screens and the like for direct resistance and induction heating has the disadvantage of introducing a foreign material into the thermoplastic joint. In hostile environments, corrosion and seepage in association with the metallic material can lead to deterioration and delamination of the plastic joint.

Rather than using a metallic element, Thorsrud (U.S. Pat. No. 4,707,402) uses electrically conductive particulate materials such as carbon black, metal oxides and mineral powders in a bonding film so as to provide a material with a high dielectric loss factor. When placed between two adjoining materials to be bonded and exposed to a radio-frequency, dielectric field, the bonding film is heated causing the adjoining materials to be bonded. Similarly, Heath et al (U.S. Pat. No. 4,765,859) uses a ferrous metal powder mixed with a thermoplastic bonding agent to bond a flanged tube to a filter cloth using radio-frequency, induction heating. However, metal, metal oxide, and carbon particles, because of their predominate rounded shape, do not serve to give reinforcement to the bond line. Rather, they often serve as crack initiation points that weaken the bond line.

Siewert et al (U.S. Pat. No. 4,276,109) forms seams in clothing fabric by using radio-frequencies to heat a first fiber in the cloth which causes a second fiber component to become molten and act as the bonding agent. This method is limited to small bond areas and thin films less than 0.125 cm thick. Such methods are not well suited to advanced thermoplastic composites since these materials are structurally rigid in nature and are typically used in substantial thicknesses of several centimeters.

Felix et al (U.S. Pat. No. 4,871,412) has demonstrated inductive heating for consolidated thermoplastic substrates containing layers of unidirectional electrical conductors at a frequency of 1–10 MHz. Such heating was noted to be ineffective below 400 kHz and above 27 MHz with a preferred heating range of 2–4 MHz. The method relies on bulk heating and the use of pressure rollers to effect heat transfer and effective bonding. The upper composite material is bulk heated more readily near the upper surface (the surface nearest to the induction coil) with heat flow downward through the composite to the bond line. As such, the induction heating must be applied slowly to avoid overheating of the composite surface nearest the induction coil and pressure must be applied to the substrates in order to insure good contact between the relatively cool lower substrate and the downward heat flow from the bulk heated upper composite substrate. Such bulk heating causes the composites to delaminate and the fiber layers to distort. To avoid such delamination and fiber-layer distortion, the outer surfaces of the composite and substrate must be pressurized from both sides during and/or immediately after the welding operation.

Burke (U.S. Pat. No. 4,673,450) has developed a method of resistance welding of carbon fiber laminates by applying a current perpendicular to the laminates so as to soften the thermoplastic of the laminates sufficiently to form a weld. The method is cumbersome and inadequate in that the surfaces of the laminates must be roughened to expose the carbon fibers in order to insure current conduction and, more seriously and as with Felix, this bulk heating technique can cause delamination and fiber distortion of the composite.

Because of the high resistivity of non-metallic fibers such as carbon fibers, attempts to clamp metal electrodes directly to opposite ends of the fibers in a longitudinal arrangement rather than the perpendicular electrode arrangement of Burke have met with little success. Use of fibers of more than a few inches requires ever increasing voltages that tend to char and burn the fiber resulting in lost of conductivity. Furthermore voltages of more than 100 volts are generally considered to be lethal.

As a result of these limitations, it has been difficult to obtain long, continuous welds in large structures without having to use 1) toxic solvents, 2) polymeric adhesives that often contain toxic monomeric components, 3) materials such as metallic components that are introduced into and weaken the bond line (weld), or 4) bulk heating of one or more of the substrates which causes delamination and fiber distortion of the substrate.

SUMMARY OF THE INVENTION

It is an object of this invention to obtain long, continuous (unbroken), thermoplastic welds on large substrates with a minimal amount of bulk heating of the substrate itself. One way in which this invention accomplishes this object is by using a series of tabs that are used in pairs and especially in "leap-frog" pairs (alternating and overlapping pairs) to obtain resistance heating preferably using non-metallic conductors. Another way this object is accomplished by using induction heating taking advantage of the induction heating of woven conductors and the unexpected property of current-conducting braid tubes in which induction heating takes place along the "center" surfaces of a flattened braid tube rather than at the edges as is the case with induction, eddy-current heating of flat, planar conducting materials.

In the resistance heating embodiment of thermoplastic welding, a welding strip is placed in the bond line of the substrate surfaces to be bonded. The bond line must contain a thermoplastic, that is, a plastic that softens and becomes sufficiently fluid to adhere and fuse to the substrate surfaces which it contacts. As herein defined and used, the term thermoplastic excludes those materials that are unable to adhere or fuse to the substrate surfaces which it contacts. The thermoplastic may be an integral part of or attached to 1) one or more of the substrate surfaces to be bonded, 2) the welding strip, 3) otherwise placed in the bond line or 4) various combinations of these arrangements.

The welding strip consists of a continuous, non-metallic, current-conducting strip that extends along the bond line of the surfaces to be bonded. For the purposes of this invention, the term strip includes all continuous, non-metallic conductors regardless of their shape, form or origin. Preferably the strip contains a plurality of carbon conductors derived from polymeric fibers such as polyacrylonitrile (PAN) fibers. Most preferably, such fibers are unidirectional (UD). To facilitate handling, these fibers are consolidated into a thermoplastic. Of course, the thermoplastic must be compatible with and bond to the substrate surfaces to be joined. A typical thermoplastic for consolidating the conducting fibers is polyether ether ketone (PEEK).

A feature of the resistance heating embodiment of this invention is the use of a plurality of current-conducting, connector tabs that are in electrical contact with the strip. At least a portion of the tabs must be spaced apart from each other. The resistance of the connector tabs must be lower than the resistance of the current-conducting strip. For example, if PAN fibers are used in the weld strip, the tabs may be comprised of pitch fibers that have a lower resistance than the PAN fibers. As with the strip fibers, the tabs fibers are preferably consolidated into a thermoplastic such as PEEK for ease of handling.

The connector tabs serve as an intermediate connection between the higher resistance strip fibers and an electrical potential. As such, they make contact with the strip fibers in the bond line and extend outward beyond the bond line and the surfaces to be bonded so as to enable connection to an electrical potential. When one of or both the weld strips and tabs are made of a consolidated thermoplastic, they are placed in contact with each other and heated sufficiently so that the conducting fibers make electrical contact with each other. This has the further advantage of providing a welding strip with attached tabs which facilitates placement of the strips and tabs into the bond line.

After the welding strip and tabs have been placed in the bond line, an electrical potential is applied to the tabs so as to cause a current to flow through the conducting strip thereby heating the strip between the tabs and causing the thermoplastic material to become sufficiently plastic to cause the surfaces to bond and fuse together.

Because the tab is made of low resistivity material, current tends to flow in the area of tab/strip material contact without producing a substantial heating effect, i.e., leaving an unbonded (noncontinuous) cold spot. Another object of this invention is to avoid such cold spots and associated unbonded areas to produce a continuous bond line. This is accomplished by using an alternating tab pair feature. Alternating pairs of overlapping tab pairs are used such that the overlap distance between tabs of overlapping pairs is smaller than the distance between the tabs of a tab pair. By applying the potential to overlapping tab pairs, typically successive tab pairs, the invention provides the advantage of heating all sections of the bond line and thereby avoiding cold spots and unbonded areas so as to produce a continuous weld.

Another object of this invention is to obtain long continuous thermoplastic welds on large structures where the bond line is curved, especially where the curves are nonuniform, that is, the bond line bends and twists in a nonuniform fashion. As such, another feature of this invention is the use of a braid tube having a plurality of current-conducting, interwoven fibers. The braid tube is oriented in the bond line so that the longitudinal axis of the braided tube is generally parallel to the bond line. Since the braid tube is usually flexible, its use has the advantage of being able to conform to curved bond lines, even bond lines that twist and turn through their length.

Another feature of the braid tube is the incorporation of thermoplastic fibers that are interwoven with the braid-tube current-conducting fibers. When used for curved bond lines, it is preferable that the braid tube be formed from unconsolidated thermoplastic fibers, that is, the braid tube should not be heated so as to consolidate it into a unified mass that does not have the requisite flexibility for conforming to a curved bond line.

The use of an interwoven thermoplastic material in the braid tube has the advantage of being readily useable to weld or fuse surfaces that are not themselves thermoplastic but which will form an appropriate bond with the thermoplastic material in the braid tube.

Another advantage of braid tube use is the ability to insert and withdraw tabs (pins), preferably of a shape that is readily inserted into and withdrawn from the fibers of the braid tube. As a result, the use of a braid tube allows the use of only two tabs that are inserted and withdrawn from segments of the braid tube in order to apply the electrical potential.

Another feature of this invention is the use of induction heating of a susceptor to form a thermoplastic bond or weld with the substrate surfaces to be joined. As with the resistance heating embodiments, the bond line of the surfaces to be joined must contain a thermoplastic material. Furthermore, the thermoplastic must be capable of being heated by a susceptor through the use of an electromagnetic field so as to fuse or sinter (weld) the substrate surfaces that are to be joined.

One feature of induction heating is the use of a wide susceptor, a major portion of which must extend beyond the bond line with only a minor edge portion of the susceptor being in the bond line. An edge heating effect in the minor portion of the susceptor, that is, in the bond line, is produced with an induction coil. The electromagnetic field of the induction coil must be displaced to one side of the centerline of the susceptor that is parallel to the bond line and the displacement must be such that the minor portion of the susceptor in the bond line including the edge is immersed in less than about a quarter of the electromagnetic field of the induction coil.

One of the advantages of wide-susceptor induction heating is that the substrate surfaces to be bonded can be made of any composition including thermosets (materials that decompose rather than reversibly soften when heated), thermoplastics (materials that reversibly soften when heated), and composites including thermoplastic composites containing current-conducting fibers. As noted previously, when the substrate is not a thermoplastic, the thermoplastic must be provided as part of the susceptor or otherwise placed into the bond line.

Because the major part of the induction coil is located over the susceptor that is out of the bond line, a major portion of the induced energy transfer (current flow) occurs in this portion of the susceptor. The various current flows break up at the edge of the susceptor in the bond line and are dissipated in the form of heat. Only a small portion of the substrate surfaces to be bonded are immersed in the electromagnetic field and, as a result, the heating effect in the substrate materials is much less even when current-conducting materials such as a thermoplastic composite substrates reinforced with current-conducting fibers are bonded to each other using the wide susceptor technique. As a result, this method tends to avoid the bulk heating effects experienced in other induction heating methods that induce currents in the substrate rather than in a separate, wide susceptor. When the substrates are non-current conducting, any induction field frequency that avoids bulk heating of the substrate is acceptable. Typically, such frequencies can be in the 100 kHz to the 27 MHz range.

Another feature of the present invention is the preferred use of electromagnetic fields in the range of about 20 kHz to about 500 kHz and more preferably in the range of about 100 to about 200 kHz to effect the edge heating of the wide susceptor when current conducting substrates are used. This has the advantage of heating the conductive wide susceptor while minimizing the bulk heating of the substrate.

Yet another feature of wide-susceptor, induction heating is to angle the susceptor away from the plan of the bonding surfaces as it emerges from the bond line and applying the electromagnetic field so that it is perpendicular to the angled wide susceptor extending out of the bond line. As a result, the substrate is immersed in the electromagnetic field at less than a right angle which has the advantage of further minimizing the bulk heating of the substrate especially when the substrate has current conducting ability.

Another feature of the invention is the incorporation of a thermoplastic into the wide susceptor, and especially into that portion of the susceptor in the bond line. Thermoplastic incorporation may be accomplished by coating the thermoplastic onto the conducting materials of the susceptor or interweaving the thermoplastic with the interwoven current-conducting fibers of a woven, wide susceptor, the latter being used as either a unconsolidated or consolidated material. The use of a thermoplastic with the susceptor has the advantage of allowing the welding of non-thermoplastic surfaces or otherwise supplying additional thermoplastic to the weld or both.

Another feature of wide-susceptor welding is the use of a thermal load on that portion of the wide susceptor that extends beyond the bond line. The thermal load can be any nonmetallic heat-conducting material such as glass plate, or materials that can provide evaporative cooling, such as, concrete, plaster of paris or similar material that can be placed on either side of the susceptor that extends out of the bond line. The use of a thermal load has the advantage of preventing over heating and subsequent loss of susceptor properties by that portion of the susceptor extending beyond the bond line, especially in that area immediately adjacent to the bond line.

Another feature of the present invention is the use of a braid-tube susceptor in the bond line. The braid-tube susceptor takes advantage of the unexpected property of current-conducting braided tubes in which induction heating takes place at the "center" portion of braid tube surface (as viewed from above) rather than at the edges. In addition, the use of a braid-tube susceptor has the advantage of requiring an electromagnetic field with a width that is equal to or less than the width of the susceptor itself. This is in contrast to an edge-heating susceptor where the edge to be heated is usually less than about a quarter of the width of the electromagnetic field.

Further advantages of the braid-tube susceptor are the fact that there is no overhanging susceptor to be trimmed from the bond line and that an unconsolidated braid-tube susceptor can be easily shaped to conform to complex curves in the bond line.

The use of a braid-tube susceptor works best with non-conducting bonding surfaces. Unlike wide-susceptor welding where the major portion of the susceptor extends beyond the bond line and serves as an "antenna" for the electromagnetic radiation from the induction coil, thereby minimizing the area (and heating) of the substrate in the electromagnetic field, braid-tube welding involves the immersing of both the susceptor and substrate in the electromagnetic field. As a result, braid tube welding works best with non-conducting substrates that are transparent to the electromagnetic field.

An advantageous step in all of the above welding forms is the application of a forging pressure at the conclusion of the heating process. The forging pressure should typically be sufficient to cause the polymer chains of the bond line and/or substrate thermoplastics to intermingle. When a non-thermoplastic substrate is used, the pressure should be sufficient to ensure good contact and bonding of the thermoplastic to the non-plastic substrate. However, the pressure should not be so great as to cause significant squeeze out of resin or heating element.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Tab Resistance Heating Using Planar Conducting Elements

Figure 1:
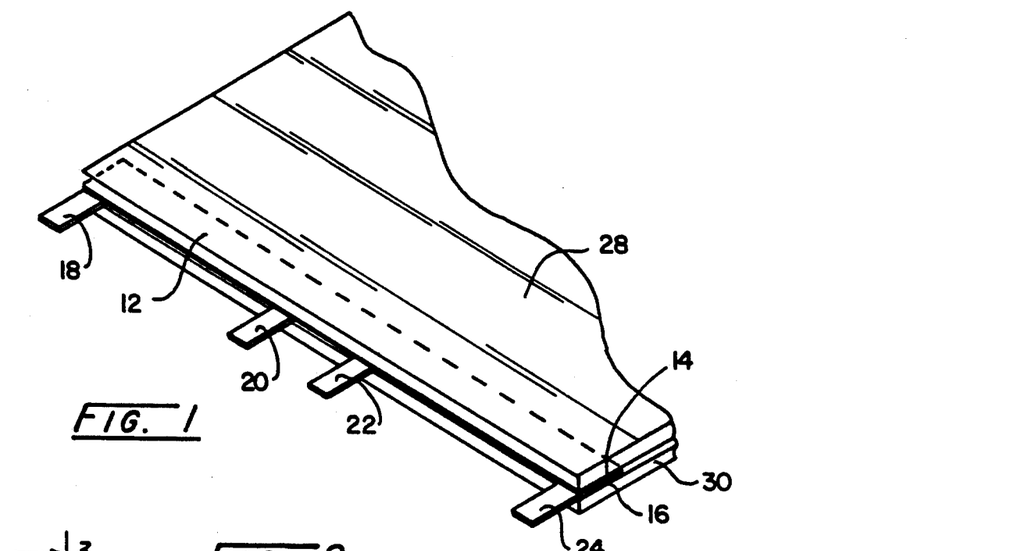
FIG. 1 is a perspective view of a resistance strip welding configuration showing the substrate and bonding surfaces and a resistance strip with attached tabs.

FIG. 1 illustrates a method of thermoplastic welding in which a current-conducting strip 12 is placed in the bond-line between the surfaces 14 and 16 of the substrates 28 and 30 that are to be bonded. Tabs 18, 20, 22, and 24 are provided for connecting the current-conducting strip 12 to an electrical potential so as to heat segments of the current-conducting strip 12.

Figure 3:
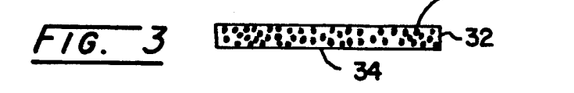
FIG. 3 is a cross section through 3—3 of FIG. 2 showing the essentially parallel (unidirectional) conducting elements in the resistance strip.

The bond-line must contain a thermoplastic that is capable of being softened to such an extent as to cause the surfaces 14 and 16 to be joined, that is fused, sintered or bonded together. A wide variety of thermoplastics may be used including, but not limited to, polyalkyls, polyaryls and mixed polyalkyls and aryls such as, polyethylene, polyvinylchloride, polyamides (nylons), polycarbonates, polyphenylene sulfides, and polyimides. The thermoplastic may be contained in and an integral part of the substrates 28 and 30 and associated surfaces 14 and 16. As shown in FIG. 3, the thermoplastic 32 may be a part of the conducting strip 12. The thermoplastic may also be provided as one or more separate layers 80, 82, 88 and 90 (FIGS. 17 and 18) that are intermediate between the heating (conducting) strip 12 and the substrate surfaces 14 and 16

Regardless of how the thermoplastic is provided, it is essential that it be positioned so as to be heated by the strip 12 in a manner to join or weld substrate surfaces 14 and 16. That is, the thermoplastic must bond the substrate surfaces 14 and 16 together.

Figure 18:
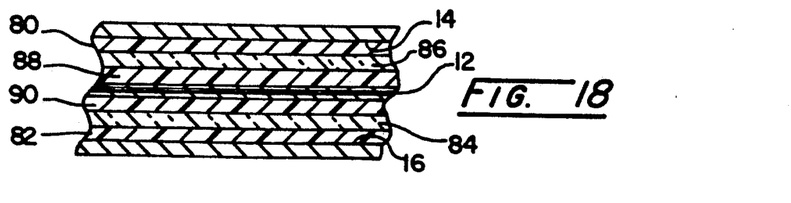
FIG. 18 is a cross-sectional view illustrating a resistance strip configuration used with conducting bond surfaces.

It is possible to join metal and other current-conducting surfaces such as an advanced thermoplastic that is reinforced with conducting fibers; however, in doing so, it may be necessary to provide an electrically insulating barrier between the current-conducting strip and the metal surface. Such a barrier is shown in FIG. 18 where layers of thermoplastic 80 and 82 are placed next to the substrate surfaces 14 and 16. Electrically insulating strips 84 and 86 are placed on the side of thermoplastic layers 80 and 82 opposite the side adjacent to the substrate surfaces 14 and 16. Another layer of thermoplastic 88 and 90 is placed on the side of insulating strips 84 and 86 opposite the side adjacent to thermoplastic layers 80 and 82. An electrically conducting strip 12 is placed between thermoplastic layers 88 and 90. In such a configuration, it is essential that the thermoplastic layers 80, 82, 88, and 90 be able to bond surfaces 14 and 16, the surfaces of the electrically insulating strips 84 and 86, and the heating strip 14 into a single bonded entity. It is also essential that the insulating strips 84 and 86 be thermally conducting so as to allow heating of thermoplastic layers 80 and 82 and the substrate surfaces 14 and 16, especially if those surfaces contain thermoplastic weld material.

Figure 2:
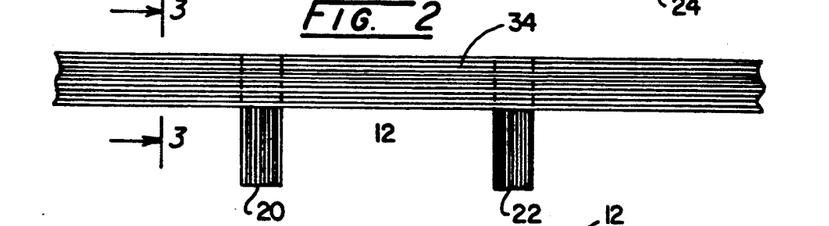
FIG. 2 is a top or plan view of a resistance 20, strip with attached tabs.

As shown in FIGS. 2 and 3, the current-conducting strip 12 is composed of continuous, unidirectional (UD), current-conducting fibers 34 such as carbonized polyacrylonitrile (PAN) fibers typically consolidated in a thermoplastic 32 such as polyether ether ketone (PEEK). This is one form of material that is commonly referred to as PAN-based prepreg.

Tabs 18, 20, 22 and 24 must be of lower resistivity than the conducting strip material (fibers 34) in order to achieve the desired heating effect. When PAN-based fibers are used for the conducting strip fibers 34, a suitable tab consists of pitch-based based carbon conductors consolidated into a thermoplastic matrix (pitch-based prepreg).

It is possible to preassemble the tabs and strip into a tab strip prior to insertion into the bond line. For example, one can heat tabs made from unidirectional (UD) pitch-based carbon conductors consolidated in a PEEK thermoplastic to about 600° F. (316° C.) and then press them onto a PEEK consolidated UD PAN fiber strip at about 10 psi for about 5 seconds to attach the tabs 18, 20, 22 and 24 to the strip 12 and achieve good electrical contact between the strip and tab conductors. The tabs 18, 20, 22, and 24 and the strip 12 may also be sanded lightly where they contact each other to ensure good electrical contact.

To obtain good electrical contact with the electric potential, the ends of the tabs that extend out of the bond line are freed of resin typically by burning away the resin. This is accomplished by clamping the tab between two pieces of aluminum, leaving exposed the ends where electrical contact is to be made. Resin on the exposed ends is then burned off with a propane torch.

It is to be understood that a wide variety of current conducting materials are contemplated by this invention including both metallic and nonmetallic electrical conductors in a wide variety of forms, e.g., fibers, sheets, ribbons, and finely-divided strips. Generally unidirectional conducting-fiber prepregs are preferred. It is essential that the resistance of the strip conductor be higher than that of the tab conductor to ensure the requisite heating effect in the bond line. Generally the resistance of strip 12 should be from about 1.05 to about 2000 times the resistance of tabs 18, 20, 22, and 24. Preferably the strip resistance should be about 1.5 to about 50 times the tab resistance and more preferably about 2 times the tab resistance.

The use of tabs such as 18, 20, 22, 24 has the advantage of allowing the heating of segments of the conductor to achieve a long bond length, while avoiding the high and even lethal voltages that would be required to heat a nonmetallic strip 12 of appreciable length, e.g., 25 cm.

Referring to FIG. 1, it can be visualized that a bond can be achieved by butting tabs 20 and 22 against each other and then applying an appropriate potential to tabs 18 and 20 followed by application of the potential to tabs 22 and 24. This has a disadvantage in that little heating is experienced where the tab contacts the strip conductors since the resistance of the tab is small and current readily flows without appreciable heating. As a result, a cold spot with little appreciable bonding (discontinuous weld) is experienced in the area of the tabs.

To avoid such cold spots, the potential is applied to overlapping tab pairs. For example, in FIG. 1, the potential is first applied to tabs 18 and 22 until the portion of the strip between those tabs is heated sufficiently to bond the surfaces in that portion of the bond line. Next the potential is applied to tabs 20 and 24 to heat the strip 12 between tabs 20 and 24. As a result of applying the potential to alternating overlapping tab pairs, cold spots and associated bonding problems are eliminated. That is, in applying the potential to tabs 18 and 22, intermediate tab 20 is welded and fused into the bond line. In applying a potential to tabs 20 and 24, tab 22 is fused into the bond line. By applying the potential to alternating and overlapping tab pairs, it is possible to achieve a continuous (unbroken) bond over long distances.

This method is especially applicable to both metallic and non-metallic strip conductors of appreciable resistance where long bonds would require lethal voltages or would otherwise be impossible to carry out because of the high voltages involved. For example, disregarding the lethal voltage factor, it has been found that when too high a voltage is applied to a non-metallic conducting strip, it will char and burn at the point of contact with the applied potential.

Using a strip conductor having a resistance of about 10 ohms per meter, a tab pair distance of about 5 cm to about 100 cm can be used with a tab pair distance of about 25 cm to about 75 cm preferred, a tab pair distance of about 40 cm to about 60 cm more preferred and a tab pair distance is about 50 cm most preferred. With the above arrangement, a tab pair overlap distance (e.g., the distance between tabs 20 and 22) of about 0.01 cm to about 50 cm can be used with a tab pair overlap distance of about 0.1 cm to about 5 cm preferred and a tab overlap distance of about 1 cm more preferred. It is to be understood that these distances are based on a number of considerations including especially the voltages involved. They are not limiting and are expected to be different depending on the type of materials and working conditions under which the weld is made.

As an example of the tab welding process, the following materials were welded under the stated conditions. A strip of APC-2 UD prepreg (ICI Fiberite Company, Wilton, Great Britain) 18 inches long (45 cm) and one inch (2.5 cm) wide was consolidated with four pieces of pitch-based prepreg (ICI Fiberite Company, Wilton, Great Britain), each 1 by 2 inches (2.5×5 cm), one on each side of the APC-2 strip to form two tabs The contact areas on the APC-2 strip were lightly sanded to ensure good electrical contact. The tabs were located about two inches apart on either side of the center of the strip (about 17.5 cm from each end). The resin was burned from each end of the strip and from the exposed ends of the tabs.

A layer of 10-mil PEEK film (Dayton Plastics, Dayton, Ohio) was placed on either side of the strip and the sandwich was placed between two 4 by 16 inch (10×40 cm) pieces of 12 ply APC-2 composite. Two segments of the strip were welded in sequence. Copper block electrodes were placed on a resin free end of the strip and the tab 10 inches (25 cm) distant and held in place with spring clips. The resistance was 2.1 ohm. Current was started at 10 A and ramped to 18 A over a 6.5 minute period. A pressure of 20 psi was applied at the end of the weld. After the first weld cooled, a section of weld was made using the remaining tab and strip end so as to produce overlap with the first weld. The second weld was carried out under similar conditions.

Figure 4:
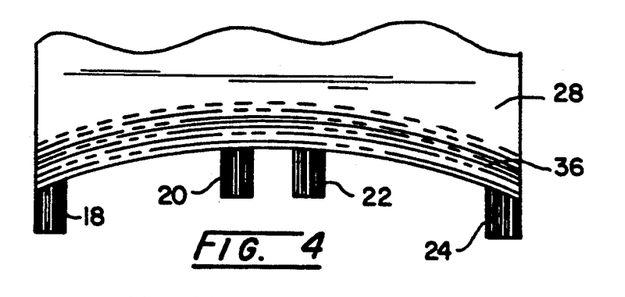
FIG. 4 is a top or plan view illustrating resistance welding strip with a curved resistance strip.

As shown in FIG. 4, it is possible to use tab welding for curved surfaces. In this case, the generally uni-directional fibers 36 are fabricated to conform to the curvature of the materials to be joined. Although this is appropriate when the surface to be joined has a standard curvature and a large number of standardized work pieces are to be welded, the method is not as readily applicable to job shop type applications where the curvature changes significantly from work piece to work piece and even in a single bond line.

Tab Resistance Welding Using Braid Tubes

Figures 7, 8:
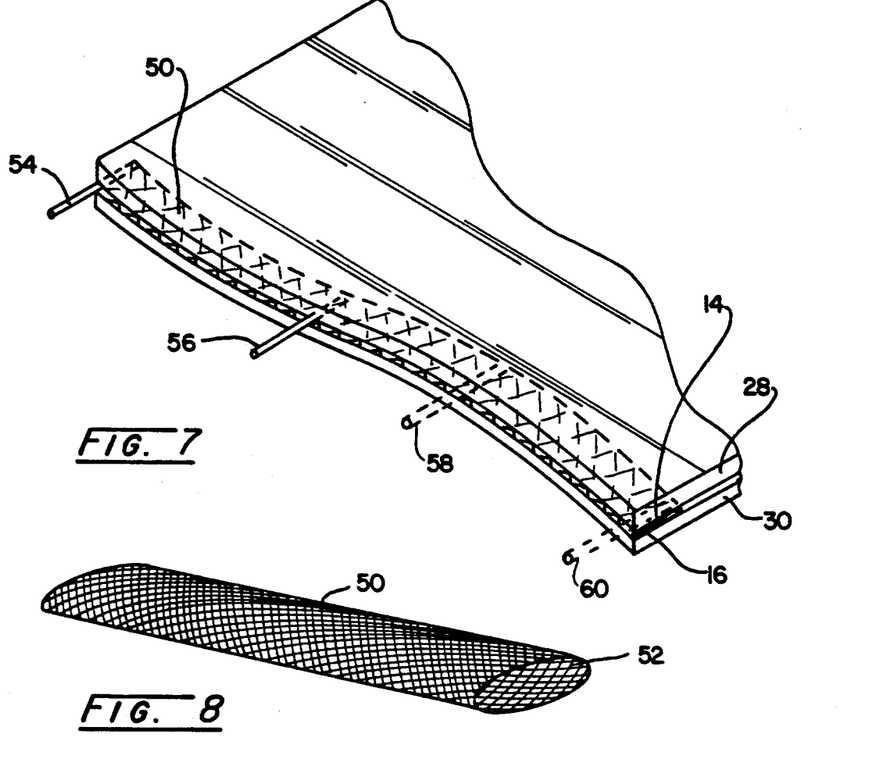
FIG. 7 is a perspective view of a resistance braid-tube configuration showing the bonding surfaces and a resistance braid-tube with inserted pin tabs.
FIG. 8 is a perspective view of a braid-tube.

To accommodate a variety of curved bond lines, it has been found advantageous to use a braid tube 50 that can readily be inserted into a curved bond line (FIGS. 7 and 8). The braid tube 50 is formed from current conducting elements such as continuous fibers 52. For example, the current conducting fibers can be composed of continuous fiber such as PAN fibers. Generally, the braid tube 50 is quite pliable and readily shaped so as to be conformed to the bond line. Thermoplastic elements such as PEEK fibers can also be interwoven among the conducting fibers to give an unconsolidated braid tube with thermoplastic weld material.

Current conducting pins 54 and 56 can be readily inserted between the weave of fibers 52 so as to make good electrical contact with the fibers 52. As with the tabs previously discussed, the pins 54 and 56 can be made of a variety of materials including both metallic and nonmetallic components. As with the tabs, they must, however, be of a lesser resistance than the current conducting fibers 52 of braid tube 50. In the present instance, it has been found that the use of metallic pins 54 and 56, such as copper pins, provide an appropriate means for applying an electrical potential to a portion of the current conducting fibers 52 of the braid tube so as to heat and fuse the thermoplastic in the bond line.

Because the pins 54 and 56 are readily insertable into the weave of the braid tube 50, it is not necessary to preform or otherwise attach them to the braid tube 50. Rather the pins 54 and 56 can be readily inserted and removed from the braid tube during the welding process. For example and as shown in FIG. 7, pins 54 and 56 are inserted so as to define a portion of the braid tube and connected to an electrical potential. The electrical potential is applied and the braid tube fibers heated so as to cause the thermoplastic material in the bond line between pins 54 and 56 to fuse and weld surfaces 14 and 16. As soon as fusion is complete, pin 54 is removed and inserted at new position 58 (indicated in phantom). The potential is reapplied to cause heating of the fibers in the portion of braid tube 50 between pins 56 and 58. After fusion is complete, pin 56 is removed from the braid tube and inserted at position 60, the potential is reapplied and the portion of the braid tube 50 between positions 58 and 60 is heated to fuse and weld the section of the bond line between pins 58 and 60. Welding is continued in this fashion for the complete length of the bond line.

As an example of this technique, twelve ply, APC-2 aromatic polymer composite substrates 28 and 30, (ICI, Wilton, Great Britain) composed of unidirectional carbon fibers in polyether ether ketone (PEEK) resin was consolidated with a one inch (2.5 cm) wide, 6 ml PEEK film (Dayton Plastics, Dayton, Ohio) on surfaces 14 and 16 of the bond line. The substrates were 3×12 inches (7.5×300 cm) with a one inch (2.5 cm) lap bond line. An unconsolidated braid tube 50 (12 inches (30 cm) long made of 66% AS4-type PAN-based fiber interwoven with 34% PEEK fibers (Atkins and Pierce, Cincinnati, Ohio) was sandwiched between 2 layers of 10 ml PEEK film and placed in the bond line. Two three inch long (7.5 cm) copper pins are inserted into the weave of the braid tube. An initial resistance of 0.75 ohm was observed. An initial current of 15 A was ramped up to 31 A to produce a weld in about 240 secs. After about five minutes, 20-90 psig pressure was applied to the bond.

Resistance Welding Power Supplies

Two different power supplies were used for resistance welding. One was a Hobart Cyber-TIG ® (constant current) power supply made by the Hobart Company of Troy, Ohio with an open circuit voltage of 45V and a capability of providing up to 200 amps. It was equipped with a programmable controller (Model 800) that was used to control ramping rates and current levels.

The 800 series controllers are normally used for metal arc welding processes where resistance is much lower than that observed with resistance elements. As a result, when the power is applied, the controller senses a relatively high resistance which it interprets as a failure to establish an arc. At this point, the power supply will automatically reset itself and begin ramping in a sawtooth fashion. This was corrected by modifying the power supply board in the controller by replacing the Zener diode. The existing diode, which has a voltage rating of approximately 28V, was replaced by one with a rating of 35 volts.

An Airco power supply (Pulse-Arc II 400) made by the ESAB/Airco Company of Chicago, Ill. was also used that had an open circuit voltage around 80V and a capacity for 400 A.

Wide Susceptor Induction Welding

Figures 10, 11, 12, 13, 14, 15, 16, 17:
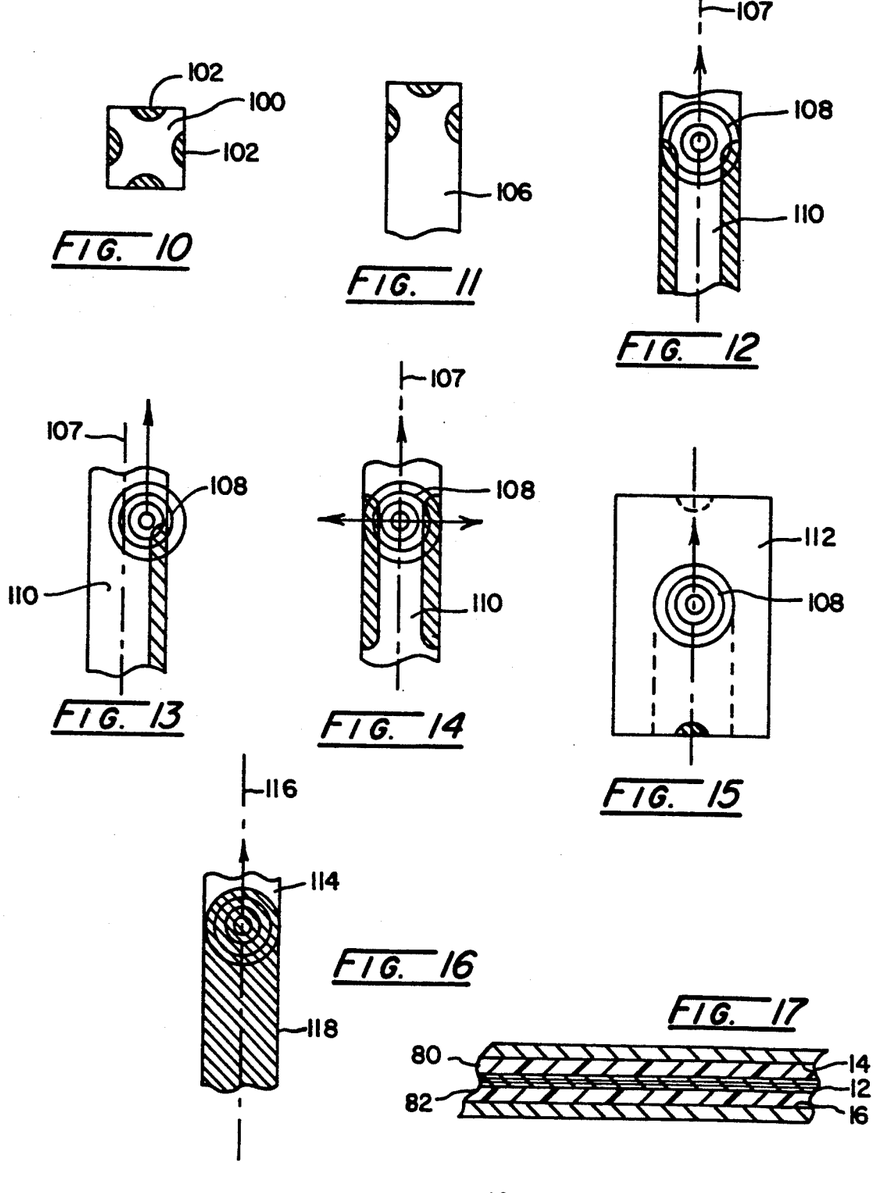
FIG. 10 is a top or plan view showing the heating pattern when an electromagnetic field is placed over a continuous conducting susceptor surface smaller than the field.
FIG. 11 is a top or plan view showing the heating pattern when an electromagnetic field is placed over a continuous conducting surface that is smaller than the continuous conducting susceptor surface but extends beyond the field in one direction.
FIG. 12 is a top or plan view showing the heating pattern of an electromagnetic field that is as wide as a continuous conducting susceptor surface and in which the field is moved along the length of the surface.
FIG. 13 is a top or plan view showing the heating pattern of an electromagnetic field that is as wide as a continuous conducting susceptor surface in which the field is displaced to one side of the center line of the surface and in which the field is moved along the length of the surface.
FIG. 14 is a top or plan view showing the heating pattern of an electromagnetic field that is as wide as a continuous conducting susceptor surface and in which the field is moved along the center-line of the surface and in a direction transverse to the center line.
FIG. 15 is a top or plan view showing the heating pattern of an electromagnetic field that is smaller than a continuous conducting susceptor surface and in which the field is moved along the center-line of the susceptor surface.
FIG. 16 is a top or plan view showing the heating pattern of an electromagnetic field of the same width as a braid-tube susceptor that is moved along the center line of the braid-tube susceptor.
FIG. 17 is a cross-sectional view illustrating a resistance strip used with non-conducting, bonding surfaces.

Electromagnetic induction heating of conducting surfaces has been known for some time. As shown in FIGS. 10-15, electromagnetic induction heating produces a heating effect referred to as "edge heating". As shown in FIG. 10, when a conducting sheet 100 such as a metallic sheet is placed completely within an electromagnetic field, heating takes place along the center of each edge. As seen in FIG. 11, when a portion of the conducting surface 106 extends beyond the field, no heating takes place on the surface as it emerges from the electromagnetic field. FIG. 12 shows the edge heating effect when an electromagnetic field 108 of the same width as the susceptor 110 is moved in a direction that is generally parallel to the centerline 107 of conducting material 110. As shown in FIG. 13, when the magnetic field 108 is displaced to one side of the centerline 107, edge heating takes place only on that side of the material 110 in the electromagnetic field 108. As shown in FIG. 14, whether the electromagnetic field 108 is moved in a direction parallel to the center line 107 or transversely to centerline 107, the same edge heating pattern is produced. Finally as shown in FIG. 15, when the electromagnetic field 108 is passed over a conducting surface 112 that is larger than the field 108, heating only takes place along the edge 115 of the material 112 cut by the electromagnetic field 108. Such edge heating effects have been observed by Felix et al in U.S. Pat. No. 4,871,412, all of which is herein incorporated by reference.

Felix has used the edge heating affect to weld conducting composite materials by the bulk heating of at least one of the welded substrates. As noted previously, such bulk heating causes the composite to delaminate and the fiber layers to distort. As a consequence, pressure must be applied from both sides of the weld to maintain the integrity of the composite. The present invention avoids bulk heating and its associated delaminating and distortion effects by using a wide susceptor. The wide susceptor allows selective heating of the substrate surfaces that form and are a part of the bond line. To achieve such selective heating, a major portion of the wide susceptor extends beyond the bond line and serves as an antenna that catches an electromagnetic field that heats the minor portion of the susceptor that is in the bond line. The electromagnetic field must be displaced from the centerline of the susceptor in the direction of the bond line and must extend beyond the edge of the minor portion of the susceptor in the bond line.

Figure 5:
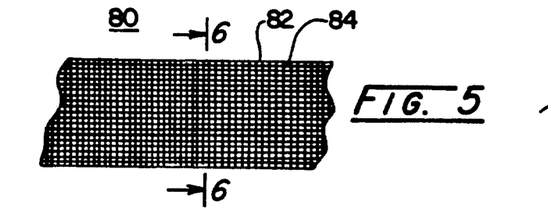
FIG. 5 is a top or plan view of a woven element susceptor used in the wide susceptor set-up of FIG. 9.
Figure 6:
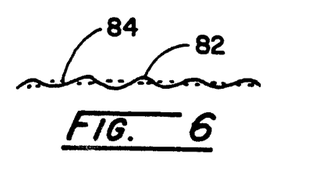
FIG. 6 is a cross section through 6—6 of FIG. 5 showing the woven elements of the woven susceptor.
Figures 9, 9A:
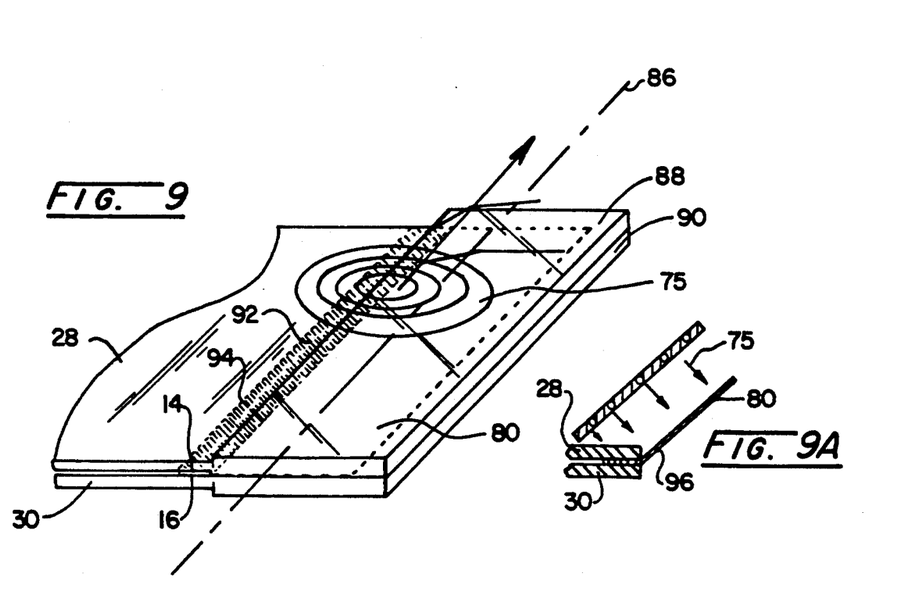
FIG. 9 is a perspective view of a wide-susceptor welding configuration showing the bonding surfaces, wide susceptor, a schematic representation of an induction coil, and a thermal heat sink.
FIG. 9A is a cross section of wide-susceptor welding in which a major portion of the susceptor is angled away from the plane of the bond line and the induction coil is aligned perpendicular to the major portion of the susceptor.

To achieve this selective heating phenomena, a set up as shown in FIG. 9 is used with a susceptor as shown in FIGS. 5 and 6. The woven susceptor 80 consists of current conducting fibers 82 interwoven with respect to each other. As discussed previously, there are a wide variety of nonmetallic conducting elements, especially conducting carbon fibers that can be used in the manufacture of the woven susceptor. These fibers are derived from a wide variety of sources such as polyacrylonitrile, polyamides, etc. Thermoplastic can be provided to the bond line in many ways including interweaving a suitable thermoplastic such as PEEK into the weave of the woven current-conducting susceptor 80. Also these materials can be consolidated to form a more rigid structure. Layered and knitted susceptors may also be used.

As shown in FIG. 9, a majority of susceptor 80 must extend out of and beyond the bond line of the substrate materials 28 and 30 (surfaces 14 and 16) to be bonded. Only a minor portion 92 of the susceptor 80 is placed in the bond line. Furthermore, the electromagnetic field 75 must be situated so that it is displaced from the centerline 86 of susceptor 80 so as to cover the bond line. Although an infinite number of centerlines could be drawn for susceptor 80, centerline 86 is that centerline that is essentially parallel to the bond line. The electromagnetic field is displaced from the centerline 86 so as to immerse the bond line in the field. Generally, the width of the susceptor 80 and the field 75 are about the same width, with a slight displacement of the field (75) toward the bond line so as to immerse susceptor edge 94 in field 75. Generally, substantial displacement of the field 75 beyond edge 94 is to be avoided as this tends to reduce the heating effect in the bond line and may cause unwanted heating of substrates 28 and 30, especially if they contain conducting materials.

One of the advantages of wide susceptor welding is that current conducting substrates 28 and 30 can be welded with a minimum of bulk heating. Heating of conducting substrates can be further minimized by using electromagnetic fields in the range of about 20 kHz to about 500 khz and preferably from about 100 kHz to about 200 kHz. For conducting substrates, almost any frequency to which the substrate is transparent, i.e., does not produce an appreciable heating effect, can be used. Thus, any convenient electromagnetic radiation frequency in the range of about 400 kHz to about 27 MHz can be used.

Heating of current conducting substrates can also be avoided by angling the electromagnetic field with respect to the substrate while maintaining it at right angles to the susceptor. As seen in FIG. 9A, the majority of the susceptor 96 is angled upward immediately after it leaves the bond line of substrates 28 and 30. The electromagnetic coil 98 is oriented so that the field 75 is perpendicular to the majority of the susceptor 96 but at an angle to the substrates 28 and 30 and that portion of the susceptor 92 in the bond line.

Because the electromagnetic field 75 usually causes some heating of the susceptor 80 in the area immediately adjacent to the bond line, it is desirable to minimize such heating by applying a thermal load 88 and 90 to that portion of the susceptor 80 that extends from the bond line. The thermal load can be comprised of any material that readily absorbs heat such as glass, plaster of paris, and concrete. Typically, the thermal load is applied as plates 88 and 90 to sandwich the susceptor 80.

The following is an example of the wide-susceptor welding. A susceptor 6 by 9 inches (15×23 cm) was cut from woven carbon PPS prepreg. A piece of 3-mil-thick film was placed on either side of the susceptor and the resulting combination was located between two sheets of carbon fiber (12.7 of the 15 cm) reinforced Ryton-brand PPS composite so that approximately 5 of the 6 inches of the susceptor stuck out of the bond line. Fireplace glass plates were used to cover the 5 by 9 inch exposed portion of the susceptor to provide a thermal load. Glass/PPS coupons were placed above and below the bond line to provide alignment and a smooth path for the single roller that traversed the bond line immediately behind the coil. A 5-turn, 6-inch-diameter pancake coil that tuned at 125 kHz was positioned so the center of the coil ran about 1-inch (2.5 cm), to the weld side, of the centerline of the susceptor. The coil overlapped the heating edge of the susceptor in the bond line. A pressure of 80 pounds was applied to the roller. The power was set for 1.1 kW and welds were made at a rate of 12 inches per minute (30 cm per minute).

Braid Tube Susceptor Induction Welding

One of the disadvantages of using a wide susceptor is the fact that the susceptor does not heat evenly when a field is applied to it. Also the susceptor typically must be trimmed from the bond line after welding has been completed. To avoid these problems, advantage is taken of induction coil heating of braid tubes where it has been unexpectedly found that the braid tube undergoes center heating rather than edge heating as is normally the case with induction heating of current-conducting materials. This is shown in FIG. 16 where it is seen that a conduction coil only as wide as braid tube susceptor 114 heats the susceptor from the centerline 116 outwardly to the edge 118.

To demonstrate the use of braid tube susceptor welding, two surfaces of a glass/Ryton ®-brand polyphenylene sulfide (Phillips 66, Bartlesville, Okla.) composite were welded using a braided tube formed from carbon fibers in which PEEK fibers were incorporated to form an unconsolidated braid tube. The flattened braid tube, as it was placed between the two substrate surfaces, was approximately one inch (2.54 cm) wide. An asymmetrical butterfly coil producing a field that was about one inch wide was used. The coil was moved along the susceptor at a rate of approximately 70 inches (29 cm) per minute. The braid tube heated to approximately 700° F. (370° C.) to give a good bond between glass/Ryton substrate surfaces.

Because the induction field passes through the substrates, narrow susceptor (braid tube) welding using induction heating is limited to substrates that are essentially transparent to the electromagnetic field. As a consequence, almost any frequency in the 100 kHz to 27 MHz can be used with frequencies in the 1–5 MHz range being preferable.

Induction Heating Coil Design

Various coil designs were examined. For braid-tube welding, the best design is a butterfly design that is narrower than the susceptor it is used to heat. The coil is used with the narrow direction oriented along the length of the weld. Although generally known to those skilled in the art, some basic considerations that apply to coil design include: 1) Field strength is proportional to the square of the of turns in the coil. 2) Turns that are too closely spaced will cause vector cancellation and loss of field strength. For best efficiency, spacing should be approximately one and one-half times wire diameter. 3) Field strength decreases with the square of distance from the coil. Thus, there is a strong dependency on the level of heating and the coil-workpiece distance. For bond lines approximately 1 inch in width (2.54 cm), coil-workpiece distances are small, for example, under ½ inch (1.27 cm), for useful heating. Variation and some control is possible in that increased power will allow the coil to be farther away or the welding rate to be increased. 4) If the coil is not parallel to the workpiece, uneven heating will result with the spot closest to the coil being heated the most. 5) The smaller the diameter of a coil winding, the shorter the range of the coil. Larger coils with more turns are more effective than small ones with few turns but larger coils also produce a wider bond line. 6) Fields are most intense at the surface of the coil. 7) Low frequencies (under 100 kHz) are desired for carbon composite welding with a metal susceptor. If small coils are needed, low frequencies can be achieved by increasing capacitance in the tuned work circuit. 8) Flux concentrators can be used to focus electromagnetic fields but they should be avoided at high frequencies since they can undergo bulk heating with rapid evolution of gas.

Figure 19:
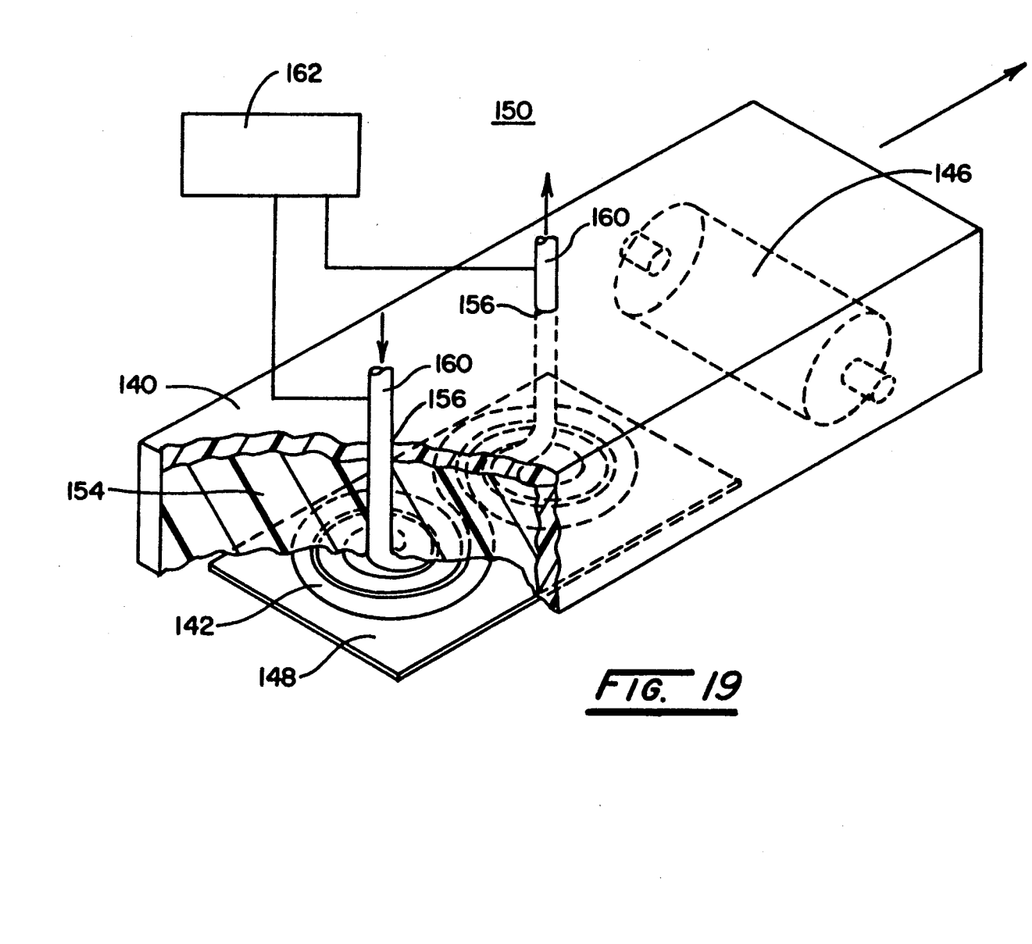
FIG. 19 is a partially cut away perspective view with a portion in schematic form illustrating a braid tube, mini-head welding tool.

For braid-tube welding, the mini-head tool 150 shown in FIG. 19 was used. The mini-head 150 combines a working coil 142 and a roller 146 for application of pressure into one unit. The unit enables welding of narrow and curved bond lines. Welding of wider bond areas can be accomplished either by scanning with the mini-head or by building a wider unit. The unit consists of a U-shaped frame 140 (1 inch wide by ⅜ inch deep; 2.5×2 cm) made from a range of materials including reinforced polyphenylene sulfide and ordinary polyvinyl chloride (PVC). The frame length is determined by the size of the coil and roller diameter. A small butterfly coil 142, approximately 1 inch wide (2.5 cm) and 1½ inches long (3.7 cm) was made so as to fit into frame cavity. The coil was made from copper tubing (⅛ inch outside diameter; 0.3 cm) and carefully bent so that all turns were on the same plane. A layer of thermally stable insulating material 148, such as mica or a thin sheet of alumina, was placed under the coil. The combination was encased (potted) in an epoxy resin 154 with the insulating layer and coil on the bottom to minimize the coil/workpiece distance. The potting was conducted to produce an epoxy-resin block 154 that snugly fit within the U-shaped frame 148 with coil leads 160 that were fed through holes 156 cut into the frame 140. The mica or alumina sheet 148 was placed over the coil face to insulate it from contact with the substrate. The coil was cooled by running water through the inside of the coil tubing (represented by arrows).

For experiments involving linear welds, this mini-head was mounted securely with adhesive or pins in a support member that was connected to a pneumatic cylinder (not shown). Pressure was transmitted from the cylinder to the support member and finally to the roller. Versions of the head with one or two rollers were made; for curved welds the one roller version is preferred. Alternatively, the mini-head could be attached to a robot arm or adapted for hand held operation as shown, for example, in U.S. Pat. No. 4,978,825 which is herein incorporated by reference.

The coil was used with a 2.5 to 3.5 MHz frequency generator (Model T-53-MCS BW) 162 made by the Lepel Corporation of Bridgewood, N.Y., to weld nonconductive composites, based on glass or Kevlar ® (DuPont, Wilimgton, Del.), with a carbon susceptor. In tests with glass-reinforced PPS composites, welding rates of 18 to 24 inches per minutes were routinely achieved. Susceptors made from unconsolidated braid tube (commingled braided tube from PEEK and AS4-type PAN fibers) with layers of PPS resin on each side gave bond strengths of 1400 to 1850 psi. With PPS composites, bond strengths obtained by using unconsolidated susceptors were higher than with consolidated ones. Apparently the resin has a better opportunity to penetrate the fiber matrix than when the PPS resin is melted onto the surface of the consolidated susceptor.

For a new welding configuration, welding conditions are identified by drawing the substrate, film and susceptor combination under the coil at rates close to those that are expected to be useful. Initially the rates should be slightly faster rather than slower to minimize overheating. Welding conditions can they be quickly found by lowering the weld rate until a sound weld is produced. Once the appropriate welding rate is identified for a particular machine setting, subsequent welds can be produced with similar results.

It is possible that changes in configurations to other than those shown could be used but that which is shown if preferred and typical. Without departing from the spirit of this invention, various means of fastening the components together may be used.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

We claim:
1. A method of thermoplastic welding comprising:
   a. placing in a thermoplastic-containing bond line of bonding surfaces of at least one substrate, a welding strip comprising:
      1) an electric, current-conducting strip of a first resistance wherein said strip extends along said bond line of said bonding surfaces; and
      2) a plurality of pairs of current-conducting, connector tabs of a second resistance in electrical contact with said strip, said first resistance being higher than said second resistance; said connector tabs extending from said strip and said bond line to enable electrical connection to an electrical potential and spaced to allow application of said electrical potential to segments of said current-conducting strip; and at least a portion of said connector tabs being spaced apart from each other; and
   b. applying said electrical potential to a pair of said tabs to cause a current to flow through a portion of said strip thereby heating a segment of said strip to cause said thermoplastic to bond said bonding surfaces together.
2. The method of thermoplastic welding of claim 1 further comprising the step of applying pressure to the bond line so as to increase the strength of a bond between said substrate surfaces.
3. The method of thermoplastic welding of claim 1 with said current-conducting strip comprising nonmetallic, current-conducting elements.
4. The method of thermoplastic welding of claim 3 wherein said non-metallic, current-conducting elements are fibers.
5. The method of thermoplastic welding of claim 1 wherein said electrical potential is applied to alternating pairs of overlay pairs of said connector tabs.
6. The method of thermoplastic welding of claim 1 with one of said bonding substrate surfaces comprising said thermoplastic.
7. The method of thermoplastic welding of claim 4 with said strip fibers having a thermoplastic consolidated thereon.
8. The method of thermoplastic welding of claim 1 wherein said substrate is an electrical conducting substrate and said current conducting strip is electrically isolated from said electrically conducting substrate by an isolation barrier that is thermally conducting and electrically isolating and wherein said thermoplastic is contained on both sides of said isolation barrier.
9. The method of thermoplastic welding of claim 4 wherein said non-metallic, current conducting fibers are carbon fibers.
10. The method of thermoplastic welding of claim 9 wherein said carbon fibers are carbonized polyacrylonitrile.
11. The method of thermoplastic welding of claim 1 with said connector tabs comprising non-metallic conductors.
12. The method of thermoplastic welding of claim 11 wherein said non-metallic conductors are pitch-based fibers.
13. The method of thermoplastic welding of claim 12 wherein said pitched-based fibers are consolidated in a thermoplastic.
14. The method of thermoplastic welding of claim 1 wherein said connector tabs are attached to said strip prior to placement in said bond line.
15. The method of thermoplastic welding of claim 1 further comprising the step of removing a portion of said tab extending from said bond line after said bonding surfaces have been bonded with said thermoplastic.
16. The method of thermoplastic welding of claim 1 wherein said current-conducting strip is a braid tube comprising a plurality of current-conducting elements and wherein the longitudinal axis of said braid tube is parallel to said bond line.
17. The method of thermoplastic welding of claim 16 wherein said bond line is curved.
18. The method of thermoplastic welding of claim 16 with said braid tube further comprising a plurality of unconsolidated thermoplastic elements interwoven among said current-conducting elements.
19. The method of thermoplastic welding of claim 16 wherein said connector tabs are pins inserted among and making electrical contact with said current-conducting elements.
20. The method of thermoplastic welding of claim 19 wherein said pins are metallic pins.
21. The method of thermoplastic welding of claim 19 further comprising the steps of removing and reinserting said pins so as to apply said electrical potential to segments of said current-conducting strip.
22. A welding strip comprising:
   a. a current-conducting, strip of a first resistance wherein said strip conforms to a bond line of surfaces to be joined; and
   b. a plurality of pairs of current-conducting, connector tabs of a second resistance in electrical contact with said strip, said first resistance being higher than said second resistance; said connector tabs extending from said strip to extend from said bond line to enable electrical connection to an electrical potential to heat a segment of said strip; and at least a portion of said connector tabs being spaced apart from each other.
23. The welding strip of claim 22 wherein said connector tabs are arranged as overlapping tab pairs with:
   a. each tab pair having a tab pair distance between each tab of said tab pair and
   b. adjacent overlapping tab pairs having a tab overlap distance between each tab of adjacent overlapping tab pairs.
24. The welding strip of claim 22 wherein said strip is consolidated in a thermoplastic.
25. The welding strip of claim 22 wherein said thermoplastic is selected from the group of thermoplastics consisting of polyetheretherketone, polyetherimide, polyphenylene sulfide, and polyethylene.
26. The welding strip of claim 22 with said current-conducting strip comprising continuous carbon elements.
27. The welding strip of claim 26 wherein said carbon elements are carbon fibers.
28. The welding strip of claim 27 wherein said carbon fibers are formed from carbonized polyacrylonitrile.
29. The welding strip of claim 22 with said connector tabs comprising a metallic conductor.
30. The welding strip of claim 22 with said connector tabs comprising carbon fibers.

31. The welding strip of claim 30 wherein said carbon-fibers are pitch-based carbon fibers.

32. The welding strip of claim 22 wherein said connector tabs are consolidated in a thermoplastic.

33. The welding strip of claim 32 with said thermoplastic comprising polyether ether ketone.

34. The welding strip of claim 22 wherein said first resistance is about 1.05 times to about 2000 times said second resistance.

35. The welding strip of claim 34 wherein said first resistance is about 1.5 times to about 50 times said second resistance.

36. The welding strip of claim 35 wherein said first resistance is about 2 times said second resistance.

* * * * *